(12) United States Patent
Lysejko et al.

(10) Patent No.: US 7,177,320 B2
(45) Date of Patent: Feb. 13, 2007

(54) TRANSFER OF DATA IN A TELECOMMUNICATIONS SYSTEM

(75) Inventors: Martin Lysejko, Bagshot (GB); Jeremy Laurence Cohen, Middlesex (GB)

(73) Assignee: Airspan Networks Inc., Seattle, WA (US)

( * ) Notice: Subject to any disclaimer, the term of this patent is extended or adjusted under 35 U.S.C. 154(b) by 832 days.

(21) Appl. No.: 09/942,790

(22) Filed: Aug. 29, 2001

(65) Prior Publication Data

US 2002/0061008 A1 May 23, 2002

(30) Foreign Application Priority Data

Sep. 27, 2000 (GB) ................. 0023688.5

(51) Int. Cl.
*H04B 7/216* (2006.01)
(52) U.S. Cl. ................. 370/441; 370/465; 370/349; 370/332
(58) Field of Classification Search ........... 370/261, 370/351, 223, 356, 328, 335, 347, 248, 252, 370/441, 465, 349, 329, 332, 333, 341, 342, 370/338, 431, 471, 392; 375/141, 377; 714/708
See application file for complete search history.

(56) References Cited

U.S. PATENT DOCUMENTS

| | | | | |
|---|---|---|---|---|
| 5,699,364 A * | 12/1997 | Sato et al. | ........... | 714/708 |
| 5,828,695 A | 10/1998 | Webb | ........... | 375/219 |
| 6,005,855 A * | 12/1999 | Zehavi et al. | ........... | 370/335 |
| 6,052,408 A * | 4/2000 | Trompower et al. | ........... | 375/141 |
| 6,330,278 B1 * | 12/2001 | Masters et al. | ........... | 375/223 |
| 6,556,549 B1 * | 4/2003 | Bender et al. | ........... | 370/328 |
| 6,570,871 B1 * | 5/2003 | Schneider | ........... | 370/356 |
| 6,603,740 B1 * | 8/2003 | Du | ........... | 370/248 |
| 6,636,500 B2 * | 10/2003 | Krishnamoorthy et al. | . | 370/347 |
| 6,683,866 B1 * | 1/2004 | Stanwood et al. | ........... | 370/350 |
| 6,748,021 B1 * | 6/2004 | Daly | ........... | 375/261 |
| 6,782,037 B1 * | 8/2004 | Krishnamoorthy et al. | . | 375/138 |
| 6,816,726 B2 * | 11/2004 | Lysejko et al. | ........... | 455/414.1 |
| 2004/0032835 A1 * | 2/2004 | Majidi-Ahy et al. | ........... | 370/252 |

FOREIGN PATENT DOCUMENTS

| | | |
|---|---|---|
| GB | 2 301 751 A | 12/1996 |
| GB | 2 320 648 A | 6/1998 |
| GB | 2 320 660 A | 6/1998 |
| GB | 2 320 661 A | 6/1998 |
| GB | 2 320 991 A | 7/1998 |
| GB | 2 326 310 A | 12/1998 |
| GB | 2 326 311 A | 12/1998 |
| WO | WO 99 18685 A | 4/1999 |
| WO | WO 00 41318 A | 7/2000 |

* cited by examiner

*Primary Examiner*—Ajit Patel
(74) *Attorney, Agent, or Firm*—Mark Haynes; Haynes Beffel & Wolfeld LLP

(57) ABSTRACT

A telecommunications system comprises a transmitter within the central terminal for sending a data message destined for a particular subscriber terminal over communication channels as a number of data blocks. A frame generator is provided within the central terminal for generating a number of frames to represent each data block, each frame having a header portion and data portion. The header portion is arranged to be transmitted in a fixed format chosen to facilitate reception of the header portion by each subscriber terminal, and is arranged to include a number of control fields for providing information about the data portion. The data portion is arranged to be transmitted in a variable format.

24 Claims, 8 Drawing Sheets

TRANSFER OF DATA IN A TELECOMMUNICATIONS SYSTEM

BACKGROUND OF THE INVENTION

1. Field of the Invention

The present invention relates to the transfer of data in a telecommunications system, and more particularly to the routing of data between a network connectable to the telecommunications system and subscriber terminals of the telecommunications system.

2. Description of the Prior Art

In a typical telecommunications system, a subscriber terminal may be located at a subscriber's premises for handling transfer of data to and from that subscriber. One or more lines may be provided from the subscriber terminal for supporting one or more items of telecommunications equipment located at the subscriber's premises. Alternatively, the subscriber terminal may be an integral part of the item of telecommunications equipment. Further, a central terminal may be provided for controlling a number of subscriber terminals, and in particular for managing transfer of data between a subscriber terminal and other components of a telecommunications network.

Each subscriber terminal communicates with the central terminal via a transmission medium, for example copper wires, optical fibres, etc for a wired system, or some form of radio resource for a wireless system. In accordance with known techniques, multiple communication channels may be arranged to utilise the transmission medium for the transmission of signals to and from the subscriber terminal. For example, in a "Code Division Multiple Access" (CDMA) system, signals may be transmitted over the transmission medium on a particular frequency channel, and this frequency channel may be partitioned by applying different orthogonal codes to signals to be transmitted on that frequency channel. Signals to which an orthogonal code has been applied can be considered as being transmitted over a corresponding orthogonal communication channel utilising the particular frequency channel. Similarly, in a "Time Division Multiple Access" (TDMA) system, a particular frequency channel can be partitioned in the time domain, such that a number of different signals can be transmitted in different time slots, the time slots forming multiple communication channels utilising the particular frequency channel. As another example, in a "Frequency Division Multiple Access" (FDMA) system, a band of frequencies may be partitioned to form a number of communication channels at particular frequencies, thereby enabling multiple signals to be transmitted over the transmission medium.

Traditionally, such telecommunications systems have been used to handle voice calls to and from the subscriber terminals, and transport mechanisms have been developed for routing the voice data for such voice calls through the telecommunications system in an efficient manner.

However, nowadays, there is an ever increasing demand for such telecommunications systems to be able to transmit other types of data in addition to, or instead of, voice data. It is possible to route such other types of data using the same transport mechanisms as those provided for handling voice data. However, unlike voice data which is delay sensitive and thus requires continuous operation and relatively constant bit rates, other types of data (e.g. Internet protocol (IP) data) are often bursty, and typically are not delay sensitive, and accordingly the transport mechanisms provided for handling voice data are often not particularly efficient at handling transfer of such other types of data.

As the demand increases for various types of data to be transmitted at higher and higher speeds, it is desirable to provide a transport mechanism which enables more efficient transmission of that data through the telecommunications system.

SUMMARY OF THE INVENTION

Viewed from a first aspect, the present invention provides a telecommunications system for connecting to a network and for routing data messages between the network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the telecommunications system comprising: a transmitter within the central terminal for sending a data message destined for a particular subscriber terminal over at least one of the communication channels as a number of data blocks; and a frame generator within the central terminal for generating a number of frames to represent each data block, each frame having a header portion and a data portion, the header portion being arranged to be transmitted in a fixed format chosen to facilitate reception of the header portion by each subscriber terminal and being arranged to include a number of control fields for providing information about the data portion, the data portion being arranged to be transmitted in a variable format selected based on predetermined criteria relevant to the particular subscriber terminal to which the data portion is destined.

The term "data message" as used herein refers to a discrete entity of data to be transmitted, and will vary dependent on the data type being transmitted. For example, for Internet Protocol (IP) data, a data message would typically be an IP data packet (this being of variable length). Similarly, for ISDN data, when operating in packet mode, a data message would typically be an ISDN data packet. For data types that form continuous data sequences, for example voice data, leased line data, or ISDN calls (when operating in continuous mode), data messages may be formed by packetizing the data sequence into data messages.

In accordance with the present invention, a transmitter is provided within the central terminal for sending a data message destined for a particular subscriber terminal as a number of data blocks. A frame generator is then provided to generate a number of frames to represent each data block, each frame having a header portion and a data portion. In accordance with the present invention, the header portion is transmitted in a fixed format chosen to facilitate reception of the header portion by each subscriber terminal, and is arranged to include a number of control fields for providing information about the data portion. The choice of such a fixed format enables each subscriber terminal to receive the header portion, and hence in preferred embodiments the header portion can include information to enable each subscriber terminal to determine whether the corresponding data portion is destined for that subscriber terminal or not. This provides a particularly efficient technique for notifying subscriber terminals whether a data portion is destined for them, without the need for any subscriber terminal to begin processing the data portion itself in order to determine that information. Any subscriber terminals to which the data portion is not destined can merely ignore the data portion provided in that frame, thereby leaving the data portion to be processed by the subscriber terminal(s) to which that data portion is destined.

In accordance with the present invention, the data portion, in contrast to the header portion, is arranged to be transmitted in a variable format selected based on predetermined criteria relevant to the particular subscriber terminal to which the data portion is destined. Accordingly, based on this predetermined criteria, a variable format can be selected which is aimed at optimising the efficiency of the data transfer to the subscriber terminal.

Generally, the more efficient data formats, i.e. those that enable higher bit rates to be achieved, are less tolerant of noise. Hence, if there is a good quality communication link with a subscriber terminal, it should be possible to use a more efficient format for the data portion than may be possible if the communication link were of poorer quality. Accordingly, in preferred embodiments, the predetermined criteria which affects the selection of the variable format comprises an indication of the signal-to-noise ratio (SNR) of signals received by the destination subscriber terminal from the central terminal. Alternatively, or in addition, the predetermined criteria may comprise an indication of the bit error rate and/or signal strength of signals received by the destination subscriber terminal.

In preferred embodiments, the signal-to-noise ratio will determine which data formats may be used for the data portion of the frame. Given the available data formats, the amount of data in the data message will then be considered. It is generally desirable to minimise the number of blocks required to send the data message, as this will reduce the noise generated through the transmission of that data message. Hence, if one of the available data formats enables the data message to be transmitted in less blocks than any other available data format, then preferably that data format will be chosen for the one or more data frames in that data block. However, assuming a plurality of formats are available which can transmit the data in the same number of blocks, e.g. one block, then the choice of format is chosen to minimise transmission power. By minimising the transmission power, the effect of the transmission on other blocks being transmitted will be minimised.

In other words, in preferred embodiments, if there are a plurality of formats selectable as the variable format given the indicated signal-to-noise ratio and the amount of data to be sent in the data block, then the frame generator is arranged to select from those plurality of formats the format requiring lowest transmission power.

In preferred embodiments, the variable format for the data portion is defined by a number of parameters, a first parameter being a channel coding to be applied to the data in the corresponding data portion. The channel coding may, for example, be convolutional encoding used for Forward Error Correction (FEC) encoding of the data. The convolutional encoding rate may be altered depending on the quality of the communication link. Hence, as an example, a rate of ½ (i.e. one bit decoded for every two bits of the encoded signal) may be used for lower quality links, whereas a rate of ¾ (i.e. three bits decoded for every four bits of the encoded signal) may be used for better quality links.

In preferred embodiments, a second parameter used to define the variable format is a modulation type to be applied to the data in the corresponding data portion. For example, different types of modulation, e.g. QAM64, QAM16, or QPSK, can be used dependent on the quality of the communication link with the subscriber terminal. Unlike voice, which typically requires constant data rate, bursty data can take advantage of variable modulation to improve efficiency.

Finally, in preferred embodiments, a third parameter used to define the variable format is a symbol rate for the data in the corresponding data portion. The symbol rate may be varied in a number of ways. For example, in a CDMA system, the symbol rate can be altered by changing the spreading gain. For a constant chip rate, the spreading gain is inversely proportional to the symbol rate. Hence, a lower spreading gain will be generally give rise to a higher symbol rate, and so lower spreading gains will typically be used for better quality communication links.

Of course, it will be appreciated by those skilled in the art that there is no requirement to use all three of the parameters identified above, and in alternative embodiments any combination of those parameters, along with any other suitable parameters (e.g. a signal constellation modifier for modifying the peak-to-mean ratio), may be used to define the variable format.

In preferred embodiments, the parameters defining the variable format used for the data portions are identified in one or more control fields of the corresponding header portion, whereby the processing circuitry within the subscriber terminal can obtain the necessary information about the format prior to processing the data portion.

As mentioned previously, the fixed format chosen for the header portion is aimed at facilitating reception of the header portion by each subscriber terminal. It will be appreciated by those skilled in the art that a number of formats may be developed for that purpose. However, in preferred embodiments, the fixed format employs a relatively low symbol rate which enables accurate reception of the header field without the need for any FEC decoding. Accordingly, in preferred embodiments, the fixed format used for the header portion employs no channel coding, although it will be appreciated that the addition of channel coding would further improve reception accuracy but at the expense of increased complexity of the reception circuitry. Furthermore, the header portion is preferably transmitted at a constant period and rate.

In preferred embodiments, each subscriber terminal comprises a first number of channel monitors to enable each of the communication channels to be monitored, whereby each subscriber terminal can read the header portion of each frame irrespective of which communication channel that frame is transmitted on. Hence, as an example, if sixteen communication channels are provided, then sixteen frames can be simultaneously transmitted over the transmission medium, and each subscriber terminal is able to the read the header portion of each of those sixteen frames.

Further, in preferred embodiments, the header portion includes an identification field identifying the subscriber terminal for which the corresponding data portion of the frame is destined, each subscriber terminal comprising a second number of processors for processing data portions destined for that subscriber terminal based on information about the variable format identified in the control fields of the corresponding header portion, and the channel monitors being arranged to identify to the processors those frames containing data portions destined for that subscriber terminal.

Hence, by the above approach, data destined for any subscriber terminal can be transmitted in a frame on any of the communication channels, and the subscriber terminal will identify those frames containing data portions destined for it, with the appropriate frames then being passed on to the processors within the subscriber terminal for processing of the corresponding data portions.

Since the header portions are transmitted in a fixed format facilitating reception of those header portions by each subscriber terminal, the channel monitor can be formed by a simple pre-processing element, which is relatively cheap and compact. Accordingly, it is perfectly acceptable to provide a channel monitor for each of the communication channels. However, since the data portions are transmitted in a variable format, and are typically channel coded, significant processing circuitry is required to decode the data portions, and it will generally not be cost effective to provide such processing circuitry for each communication channel, since in most implementations the per subscriber data rate will be only a fraction of the transmission medium data rate.

Accordingly, in preferred embodiments, the second number of processors are less than the first number of channel monitors, whereby at any point in time the header portions of the frames on each of the communication channels can be read, but only the second number of data portions can be processed by a particular subscriber terminal. By this approach, even though any particular subscriber terminal can only decode up to the second number of data portions at any one time, the central terminal has complete flexibility as to which communication channel data portions destined for that subscriber terminal are transmitted in, thus enabling the central terminal to make efficient use of the available resources of the transmission medium. In certain embodiments, some of the communication channels may exhibit better signal-to-noise ratios than other communication channels, and accordingly this flexibility can be used to make use of the communication channels that facilitate the use of the more efficient format.

The previous description has concentrated on the use of the invention to facilitate the transmission of data on a downlink communication path from the central terminal to the subscriber terminal. However, in preferred embodiments, the frame format can be used for transmission of data on an uplink communication path from the subscriber terminal to the central terminal. Accordingly, in preferred embodiments, the frame generator is also provided in at least one of the subscriber terminals to enable frames to be generated for data blocks to be transmitted from the subscriber terminal to the central terminal, the subscriber terminal being arranged to issue to the central terminal over the transmission medium a request signal when it has data to send to the central terminal, the central terminal being responsive to the request signal to grant access to the subscriber terminal on a communication channel selected by the central terminal.

It will be appreciated that certain of the fields provided within the header portion of preferred embodiments are in theory not required for an uplink frame. For example, the identification field used in preferred embodiments to identify the destination subscriber terminal may be redundant assuming that there is only one central terminal to which the uplink frame can be sent. In that event, in preferred embodiments, any such fields can be used in the uplink frame to contain any uplink specific protocol information. For example, such control fields may be used to indicate the number of blocks or frames remaining for the subscriber terminal to send.

In preferred embodiments, the central terminal manages allocation of communication channels to the subscriber terminals for sending frames from the subscriber terminals to the central terminal, to avoid any contentious access by multiple subscriber terminals to the same communication channel.

It will be appreciated by those skilled in the art that there are a number of different approaches that may be used for avoiding such contentious accesses. However, in preferred embodiments the central terminal is arranged to grant access by including in a control field of a frame issued by the central terminal on the selected communication channel a grant signal identifying the subscriber terminal. This approach is possible due to the fact that each subscriber terminal will receive each header portion of the frame, irrespective of which communication channel it is sent on. Accordingly, the relevant subscriber terminal will identify the grant signal in the selected communication channel, and hence will be free to issue an uplink frame of data on that selected communication channel. It should be further noted that this grant signal of preferred embodiments can be issued to the subscriber terminal on any selected communication channel in any frame, irrespective of whether that frame contains a data portion destined for that subscriber terminal.

In preferred embodiments the grant signal grants the subscriber terminal access to the selected communication channel to send one frame, the subscriber terminal being arranged to continue asserting the request signal until a grant signal has been received for the final frame that the subscriber terminal has to send.

In addition to the header portion having control fields to provide information about the data portion, and to provide grant signals to subscriber terminals for uplink communications, various other control fields can also be provided within the header portion. For example, in preferred embodiments, the header portion includes a power control field for identifying a power control signal to be used by the recipient of the frame to control the power of signals subsequently issued by that recipient. In preferred embodiments, the power control signal specifies incremental adjustments to be made to the power. Additionally, in preferred embodiments, the header portion includes a code synchronisation control field for identifying a code synchronisation signal to be used by the recipient of the frame to control the code synchronisation of signals subsequently issued by that recipient. Again, as with the power control signal, the code synchronisation signal preferably specifies incremental adjustments to be made to the code synchronisation.

It will be appreciated by those skilled in the art that to enable the field to be read accurately, the recipient of the frame needs to determine the phase of the carrier signal, which may vary over time. Accordingly, in preferred embodiments, the header portion includes a field containing a predetermined training sequence used by the recipient of the frame to determine the phase of a carrier signal.

It will be appreciated that the telecommunications system of the present invention may be either a wired or a wireless telecommunications system. However, in preferred embodiments, the telecommunications system is a wireless telecommunications system, wherein the transmission medium is a radio resource facilitating wireless communications between the central terminal and the subscriber terminal. Further, in preferred embodiments, the communication channels are orthogonal channels defined using CDMA.

Viewed from a second aspect, the present invention provides a method of operating a telecommunications system to route data messages between a network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the method comprising the steps of: transmitting a data message destined for a particular subscriber terminal from the central terminal over at least one of the communication channels as a number of data blocks; and generating a number of frames to represent each data block to be transmitted, each frame having a header portion and a data portion, the header portion being arranged to be transmitted in a fixed format chosen to facilitate reception of the header portion by each subscriber terminal and being arranged to include a number of control fields for providing information about the data portion, the data portion being arranged to be transmitted in a variable format selected based on predetermined criteria relevant to the particular subscriber terminal to which the data portion is destined.

Viewed from a third aspect, the present invention provides a computer program operable to configure a telecommunications system to perform a method in accordance with the second aspect of the present invention. The present invention also relates to a carrier medium comprising such a computer program.

Viewed from a further aspect, the present invention provides a frame generator for a telecommunications system in accordance with the first aspect of the present invention, the frame generator being arranged to generate a number of frames to represent a data block to be transmitted over the transmission medium, each frame having a header portion and a data portion, the header portion being arranged to be transmitted in a fixed format chosen to facilitate reception of the header portion by each subscriber terminal and being arranged to include a number of control fields for providing information about the data portion, the data portion being arranged to be transmitted in a variable format selected based on predetermined criteria relevant to the particular subscriber terminal to which the data portion is destined.

Viewed from a further aspect, the present invention provides a transmission signal comprising at least one frame, the frame having a header portion and a data portion, the header portion being arranged to be transmitted in a fixed format chosen to facilitate reception of the header portion by a plurality of receivers and being arranged to include a number of control fields for providing information about the data portion, the data portion being arranged to be transmitted in a variable format selected based on predetermined criteria relevant to a particular receiver to which the data portion is destined. The present invention also relates to a transmission medium arranged to carry such a transmission signal.

BRIEF DESCRIPTION OF THE DRAWINGS

The present invention will be described further, by way of example only, with reference to a preferred embodiment thereof as illustrated in the accompanying drawings, in which.

DESCRIPTION OF PREFERRED EMBODIMENT

For the purposes of describing a preferred embodiment of the present invention, an implementation in a wireless telecommunications system will be considered. Before describing the preferred embodiment, an example of such a wireless telecommunications system in which the present invention may be employed will first be discussed with reference to FIGS. 1 to 3.

Figure 1:
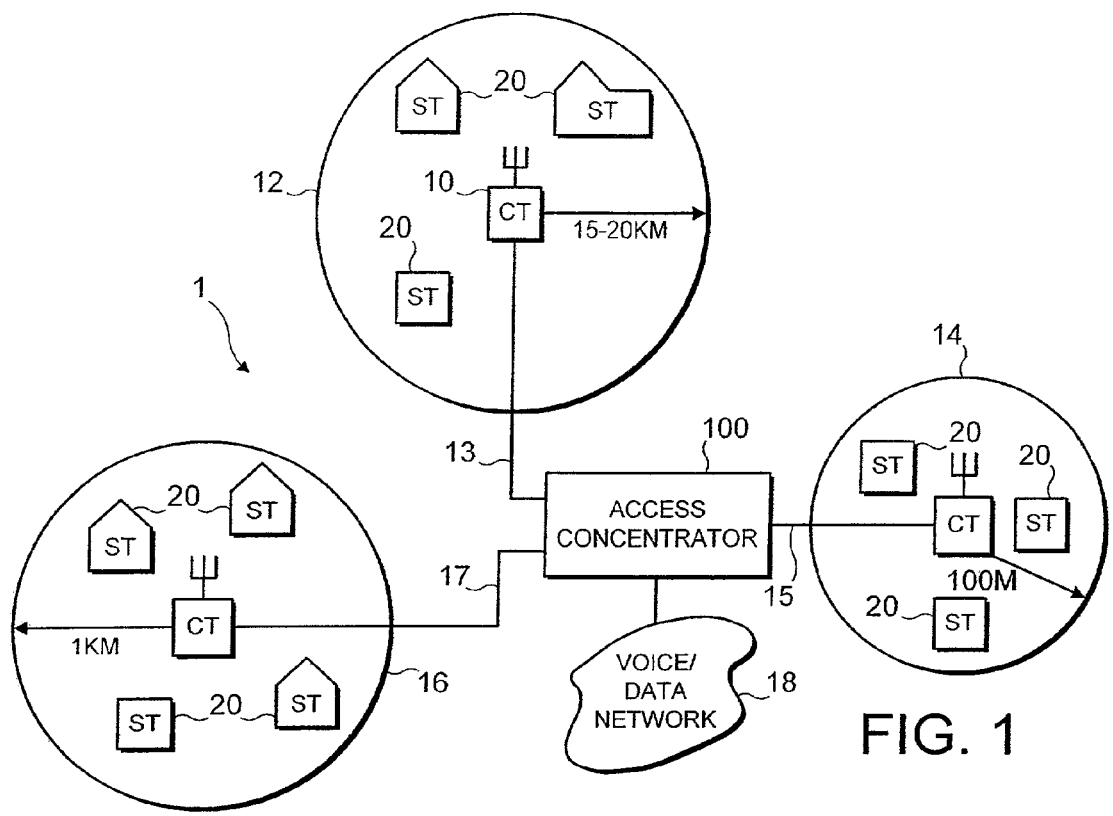
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The wireless telecommunications system of FIG. 1 is based on providing radio links between subscriber terminals 20 at fixed locations within a service area (e.g., 12, 14, 16) and the central terminal 10 for that service area. These wireless radio links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with a central terminal. Hence, techniques have been developed to enable data relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST. Each CT 10 can then be connected directly to the switch of a voice/data network 18, for example the switch of a public switched telephone network (PSTN). In the following description, a PSTN is referenced as an example of the voice/data network.

However, as the number of users of telecommunications networks increases, so there is an ever-increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available to handle wireless links with those STs, the exact number supported depending on a number of factors, for example the projected traffic loading of the STs and the desired grade of service. These orthogonal channels are then assigned to particular STs on demand as needed. This approach means that far more STs can be supported by a single central terminal than is possible in a fixed assignment mode. In preferred embodiments of the present invention, each subscriber terminal 20 is provided with a demand-based access to its central terminal 10, so that the number of subscribers which can be serviced exceeds the number of available wireless links.

However, the use of a Demand Assignment mode complicates the interface between the central terminal and the switch of the PSTN. On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, an Access Concentrator (AC) 100 is preferably provided between the central terminals and the switch of the PSTN, which transmits signals to, and receives signals from, the central terminal using concentrated interfaces, but maintains an unconcentrated interface to the switch, protocol conversion and mapping functions being employed within the access concentrator to convert signals from a concentrated format to an unconcentrated format, and vice versa. Accordingly, as shown in FIG. 1, the CTs 10 are connected to the AC 100 via backhaul links 13, 15 and 17, with the AC 100 then providing the connection with the PSTN 18. The backhaul links can use copper wires, optical fibres, satellites, microwaves, etc.

It will be appreciated by those skilled in the art that, although the access concentrator 100 is illustrated in FIG. 1 as a separate unit to the central terminal 10, and indeed this is the preferred implementation, it is also possible that the functions of the access concentrator could be provided within the central terminal 10 in situations where that was deemed appropriate.

For general background information on how the AC, CT and ST may be arranged to communicate with each other to handle calls in a Demand Assignment mode using a transport mechanism suitable for continuous data sequences such as voice data, the reader is referred to GB-A-2,326,310 and GB-A-2,326,311.

Figure 2:
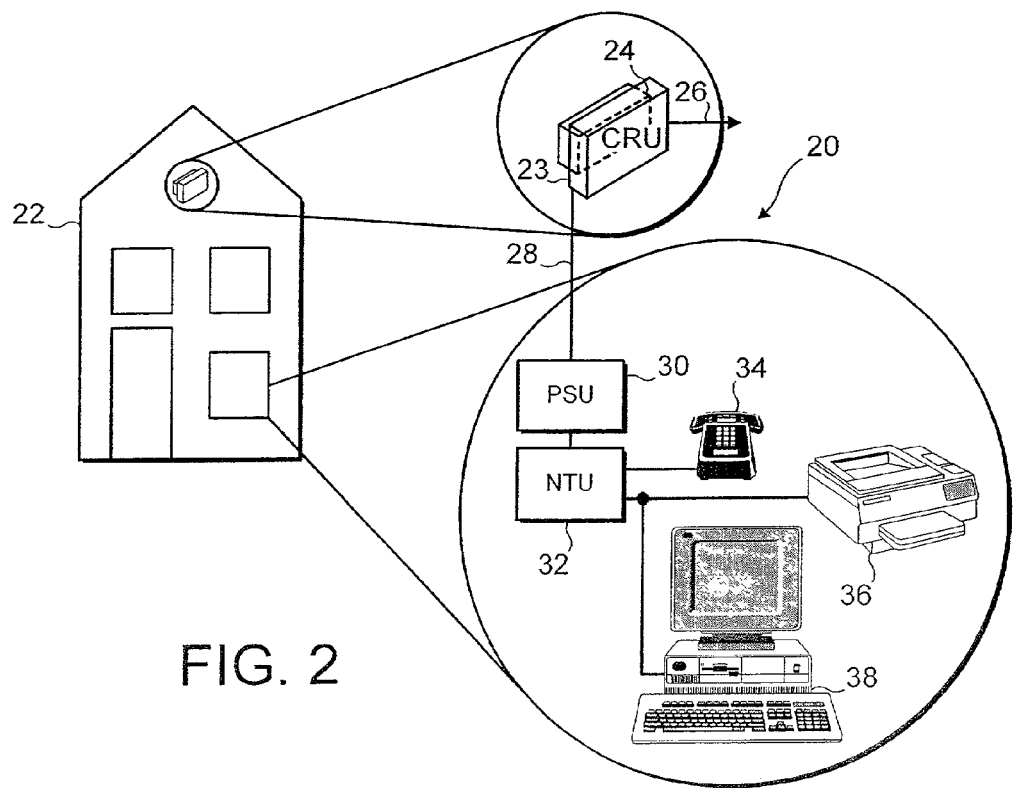
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications, e.g. Internet protocol (IP), ISDN BRA standard, leased line data (n×64K), etc.

Figure 3A:
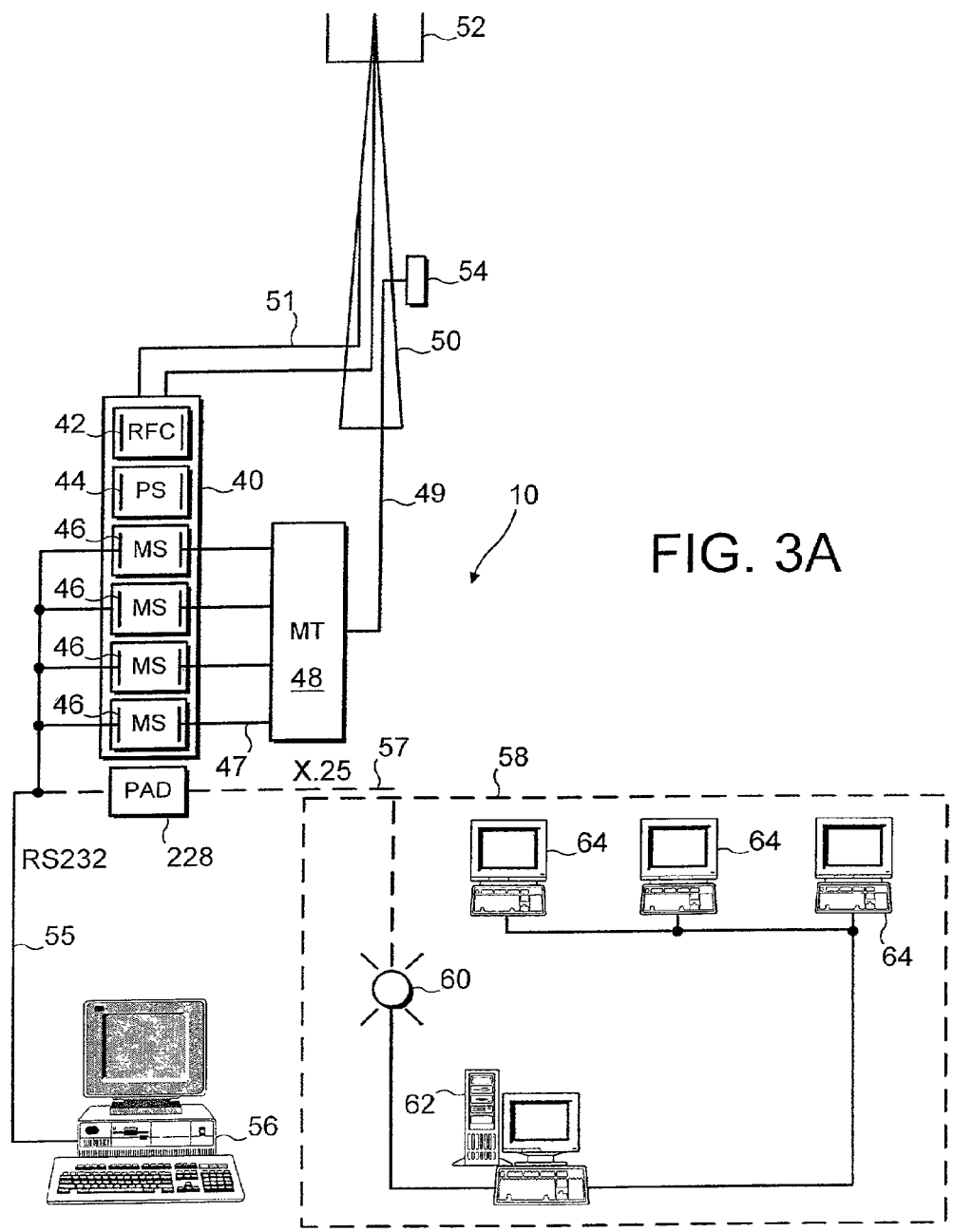
FIG. 3A is a schematic illustration of an example of a central terminal of the telecommunications system of FIG. 1.

FIG. 3A is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to the Access Concentrator. As mentioned above, other types of connections (e.g., copper wires or optical fibres) can be used to link the central terminal 10 to the Access Concentrator. In this example the modem shelves are connected via lines 47 to a microwave terminal (MT) 48. A microwave link 49 extends from the microwave terminal 48 to a point-to-point microwave antenna 54 mounted on the mast 50 for a host connection to the Access Concentrator.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3A) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 may be based around a powerful workstation 62 and can include a number of computer terminals 64 for network engineers and control personnel.

Figure 3B:
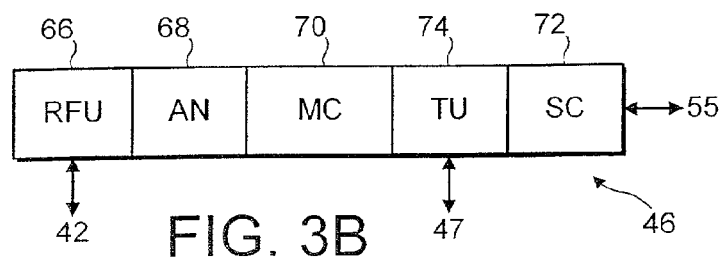
FIG. 3B is a schematic illustration of a modem shelf of a central terminal of the telecommunications system of FIG. 1.

FIG. 3B illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of the various transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may, for example, include ½ rate convolution coding and×16 spreading with "Code Division Multiplexed Access" (CDMA) codes on the transmit signals, and synchronisation recovery, de-spreading and error correction on the receive signals. The modem cards 70 are connected to the tributary unit (TU) 74 which terminates the connection to the Access Concentrator (e.g., via one of the lines 47) and handles the signalling of telephony information to the subscriber terminals via one of the modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

The wireless telecommunications between a central terminal 10 and the subscriber terminals 20 could operate on various frequencies, and so, for example, can be arranged to support system implementation in various frequency ranges within the PCS, ITU-R and ETSI 2 GHz and 3 GHz frequency ranges. As an example, the wireless telecommunication system may operate in the Band defined by ITU-R (CCIR) Recommendation F.701 (2025–2110 MHz, 2200–2290 MHz), where 12 uplink and 12 downlink radio channels of 3.5 MHz each may be provided centred about 2155 MHz. In this example, the duplex spacing between a corresponding uplink and downlink radio channel is 175 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links (or "communication channels" as they are also referred to herein) to subscriber terminals to be simultaneously supported on a plurality of orthogonal channels within each frequency channel.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on signal processing stages that may be employed in the subscriber terminals and central terminal to manage CDMA voice communications between them.

The above description has provided an overview of a suitable wireless telecommunications system in which the present invention may be employed. The techniques used in preferred embodiments of the present invention to transfer data in the wireless telecommunications system of preferred embodiments will now be discussed.

Figure 4A:
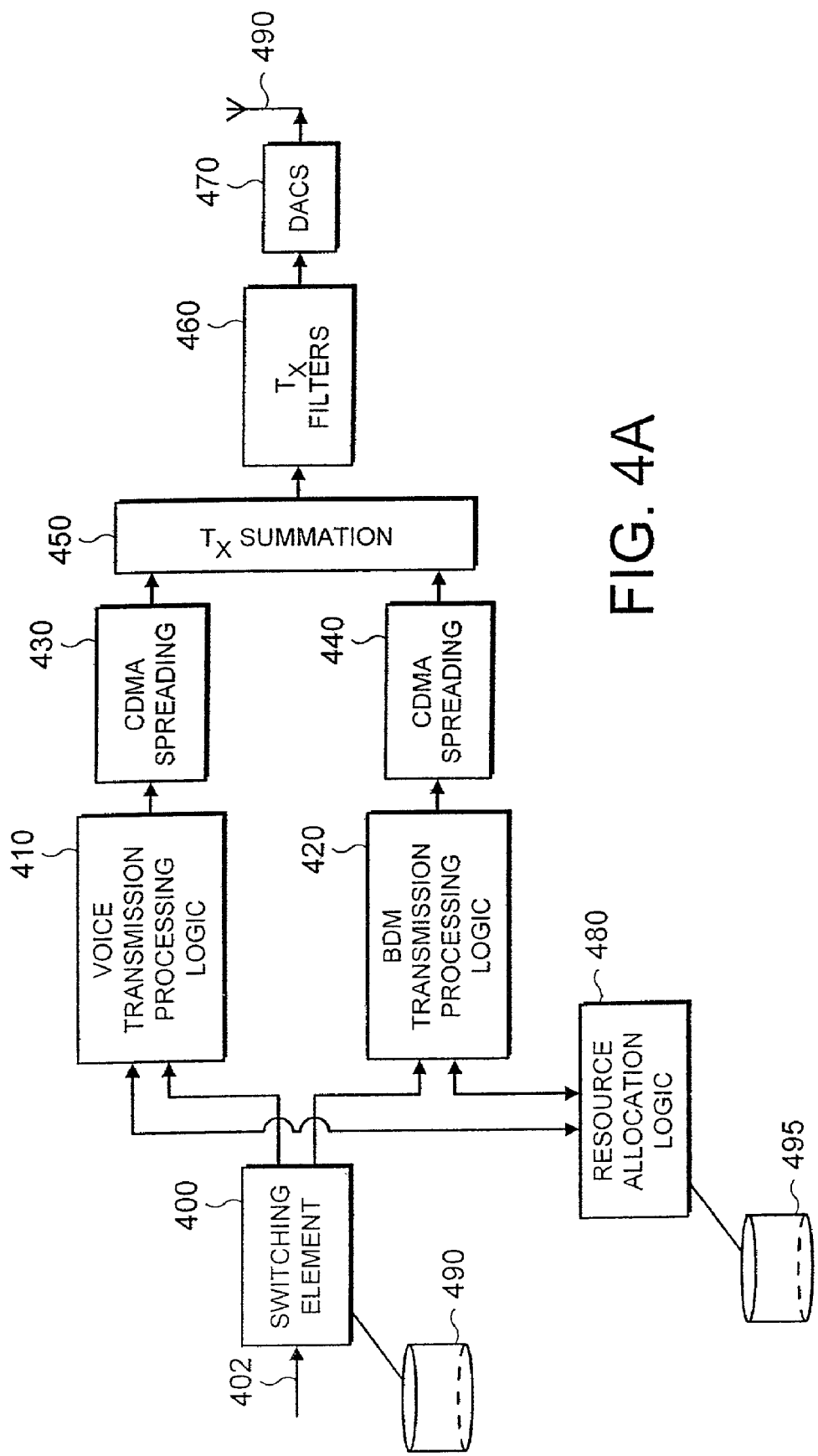
FIG. 4A is a block diagram illustrating the elements provided within the central terminal of preferred embodiments of the present invention to enable data to be transmitted by either of two separate transport mechanisms.

FIG. 4A is a block diagram illustrating components provided within the central terminal of preferred embodiments in order to enable data to be transmitted via either of two different transport mechanisms. More particularly, a first transmission processing logic 410 is provided which employs a transport mechanism designed for transmitting data types that form continuous data sequences. A good example of such a data type is voice data, and hereafter this first transmission processing logic 410 will be referred to as the voice transmission processing logic.

Further, in accordance with preferred embodiments, a second transmission processing logic 420 is provided which employs a transport mechanism designed for transmitting data messages, i.e. discrete entities of data. This transport mechanism is particularly suited to data types that send data in bursts, and hereafter this second transmission processing logic 420 will be referred to as the Block Data Mode (BDM) transmission processing logic.

As data is received by the central terminal over path 402, it is received by a switching element 400, which applies certain predetermined criteria to determine which transmission processing logic 410, 420 to pass the data to for transmission. The predetermined criteria used by the switching element 400 is preferably stored within a storage 490 within the central terminal, and preferably includes information identifying the preferred transmission processing logic for any particular data type, along with information about the transport mechanisms supported by the various subscriber terminals that may communicate with the central terminal.

Preferably, there will be a predetermined relationship between the data type and the most appropriate transport mechanism to be used for that data type, and accordingly, unless other predetermined criteria dictate otherwise, the switching element will route the data to the voice or BDM transmission processing logic based on whether data of that data type is best transmitted using the voice transport mechanism or the BDM transport mechanism, respectively.

As mentioned earlier, the voice transport mechanism of preferred embodiments is more suited for data types that form continuous data sequences, for example voice data, or leased line data, whereas the BDM transport mechanism of preferred embodiments is more suited to more bursty data, such as Internet Protocol (IP) data. Further, it should be noted that certain forms of data, such as ISDN data, may actually have more than one basic data type. For example, ISDN data can either be sent in a packet mode, or a continuous mode, and hence there will preferably be at least two data types for ISDN data to reflect the two different ISDN modes.

In addition to specifying the data types relatively coarsely based on their basic type, e.g. IP, voice, ISDN packet mode, etc, further parameters can be taken into account in order to specify data types at a finer granularity. For example, a number of data types may be specified using predetermined parameters, and then the corresponding parameters will be taken into account for any data to be routed by the switching element. Thus, as an example, a number of different data types for IP data may be specified using a priority parameter coded as follows:

| Value | Priority |
|---|---|
| 0 | Normal |
| 1 | Minimise monetary cost |
| 2 | Maximise reliability |
| 4 | Maximise throughput |
| 8 | Minimise delay |

Other parameters that may be used to define different data types are tolerance to absolute delay, tolerance to delay variation, and tolerance to packet loss (bit error rate). Voice/video services generally have a low tolerance to all of the above parameters, whereas best effort IP data is generally more tolerant to all of the above parameters. It will be appreciated that the above identified parameters are merely examples of parameters that may be used to define data types, and that various other parameters could alternatively be used.

As the data is received by the switching element 400, the switching element 400 will determine the subscriber terminal to which the data is destined, and will check the information within storage 490 to confirm whether that subscriber terminal can support either transport mechanism. If the subscriber terminal can only support one transport mechanism, then the switching element will route the data to the corresponding transmission processing logic 410, 420 irrespective of any other criteria. Accordingly, as an example, if the destination subscriber terminal only supports the transport mechanism used by the voice transmission processing logic 410, then the data will be routed by the switching element 400 to the voice transmission processing logic 410.

However, assuming that the destination subscriber terminal can support either transport mechanism, then the switching element 400 is arranged to determine the data type of the data received over path 402, and to determine from the information stored in storage 490 the preferred transport mechanism to be used for that data type. For example, voice data is preferably routed to the voice transmission processing logic 410, whilst IP data is preferably routed to the BDM transmission processing logic 420. Similarly, ISDN data formed in packet mode will preferably be routed to the BDM transmission processing logic 420, whilst ISDN data formed in continuous mode will preferably be routed to the voice transmission processing logic 410. Leased line data can also be routed to either transmission processing logic, and the routing of leased line data will typically be statically provisioned by the management system. For example, if the leased line data is being used in a delay sensitive application, then it will typically be arranged such that that data is routed via the voice transmission processing logic.

The communication between the central terminal and the subscriber terminals is via a radio resource, and the multiple communication channels are arranged to utilise the radio resource for the transmission of signals to and from the subscriber terminal. In preferred embodiments, CDMA techniques are used to form the multiple communication channels. Resource allocation logic 480 is used to allocate the communication channels to either the voice transmission processing logic 410 or the BDM transmission processing logic 420 based on certain predetermined criteria. The predetermined criteria employed by the resource allocation logic 480 is preferably stored within the storage 495 within the central terminal.

It will be appreciated by those skilled in the art that the predetermined criteria applied by the resource allocation logic may take a variety of forms. However, in preferred embodiments, the predetermined criteria specifies the voice transmission logic 410 as having the higher priority but by default allocates the communication channels to the BDM transmission processing logic 420. Hence, the BDM transmission processing logic 420 is allocated all of the communication channels in the absence of any transmission activity by the voice transmission processing logic 410. However, as soon as the voice transmission processing logic has data to send, the resource allocation logic 480 will allocate one or more communication channels to the voice transmission processing logic, irrespective of the demand placed on the BDM transmission processing logic. When the demands placed on the voice transmission processing logic decrease, the resource allocation logic will then reallocate communication channels to the BDM transmission processing logic.

In preferred embodiments, the voice transport mechanism has the advantage of exhibiting low delay (<1 ms one way), and constant bit rate. However, it exhibits only moderate spectral efficiency, and there is a significant time overhead for call set-up, clear down (~500 ms). In contrast, the BDM transport mechanism has the advantage of exhibiting highest spectral efficiency, and fast packet multiplexing. Variable bit rates are used for transmission, and moderate delay is incurred (12–16 ms one way).

The effect of allocating channels to the voice transmission processing logic is to lower throughput and increase the delay experienced by users of the BDM transmission processing logic. The main advantage of this approach is its simplicity. The voice transmission processing logic of preferred embodiments operates as a connection based medium so demand is readily measured by analysing call set-up and clear-down events.

As an alternative to the above approach for resource allocation, the predetermined criteria applied by the resource allocation logic may comprise priority information identifying relative priorities for different data types. Through this approach, the resource allocation logic 480 can be arranged to allocate communication channels with the aim of optimising quality of service (QoS) obligations. The storage 495 of the resource allocation logic 480 can be arranged to maintain as the priority information a database of QoS targets per user per data type. QoS may be defined in a number of different ways depending on data type, e.g. for a voice call it may be the percentage call success rate, for IP it may be a lower bound on bit rate measured in bits per second. It will be appreciated that more complex measures are also possible. At any point in time the system is carrying traffic and is subject to new demand. For each active traffic link the resource allocation logic can be arranged to measure actual QoS versus target QoS and to use this information to generate a weighted score which represents how well the overall QoS target is being met. The resource allocation logic can then adjust channel usage to maximise this score.

As a further alternative approach to handling resource allocation, the predetermined criteria applied by the resource allocation logic 480 may comprise information about demand placed on the voice and BDM transmission processing logic. By this approach, resource can be allocated with the aim of maximising throughput and spectral efficiency. Hence, for example, under lightly loaded conditions communication channels could be allocated as requested by the switching element 400. When load increases to a point where all channels are used, the resource allocation logic 480 is then arranged to recognise that one of the transport mechanisms may be more spectrally efficient at the expense of another parameter, e.g. delay. Hence, as an example, voice calls which would otherwise be transmitted via the voice transmission processing logic may be converted to "Voice over IP" (VOIP) data to be transmitted via the BDM transmission processing logic.

In preferred embodiments, the resource allocation logic 480 keeps a record of which communication channels have been allocated to which transmission processing logic, this record for example being stored within the storage 495.

Once the voice transmission processing logic 410 and BDM transmission processing logic 420 have processed the data supplied to them for transmission to conform with the corresponding transport mechanisms, the data for transmission is output to corresponding CDMA spreading logic 430, 440, where CDMA spreading functions are performed. As is standard for transmission of CDMA signals, the various individual CDMA spread signals are summed in summation logic 450, then passed through transmission filters 460 and digital-to-analogue converters (DACs) 470 prior to transmission from transmitter 490.

The voice transmission processing logic 410 can be embodied by any of a number of known voice transmission circuits which employ a transport mechanism designed for transmitting data types such as voice data that form continuous data sequences, and accordingly the construction of the voice transmission processing logic 410 will not be discussed any further herein. However, for the interested reader, information on the handling of voice calls in a wireless telecommunications system, including the transfer of those calls over the radio interface between the central terminal and the subscriber terminal, is discussed in GB-A-2,326,310 and GB-A-2,326,311. Further details on the transmission techniques that may be employed within the voice transmission processing logic 410 are described in GB-A-2,320,660, GB-A-2,320,661, GB-A-2,320,648 and GB-A-2,320,991.

Figure 4B:
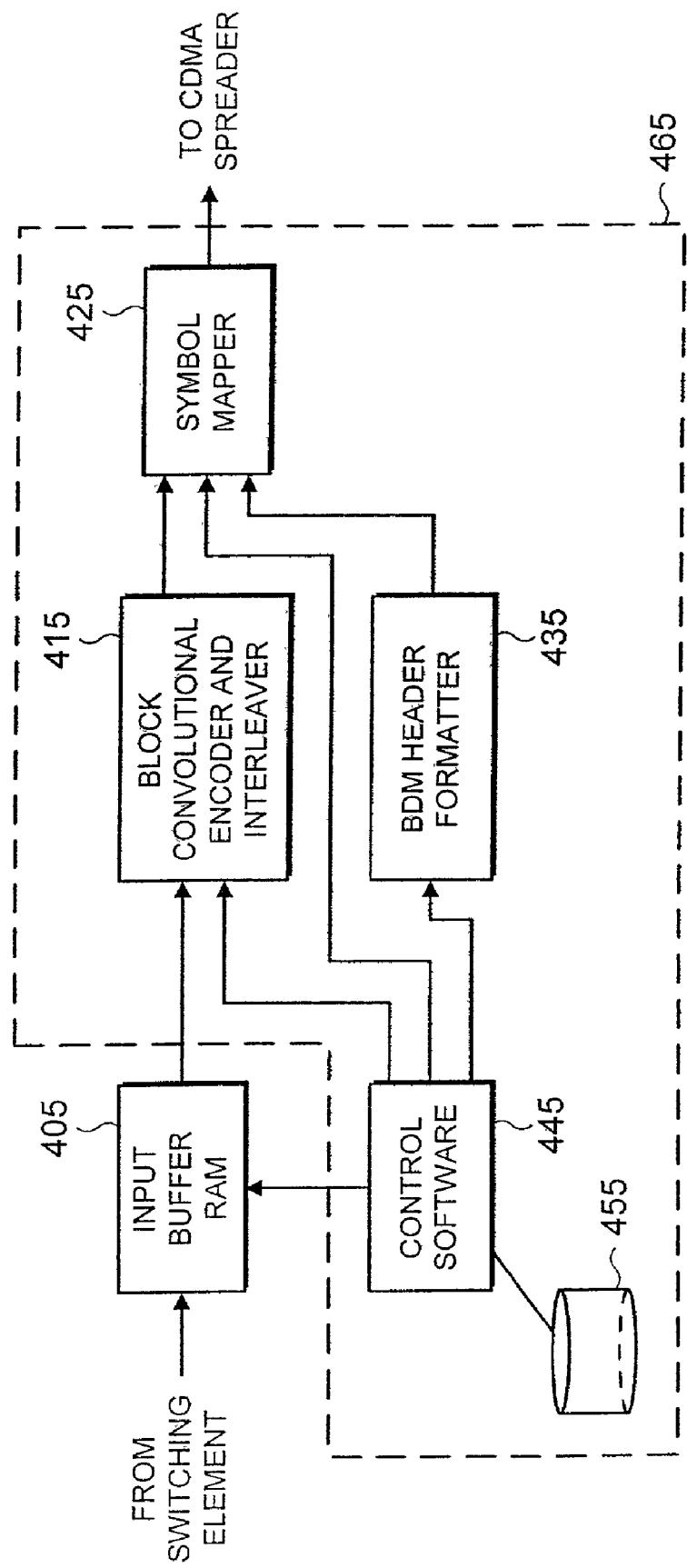
FIG. 4B is a block diagram illustrating in more detail elements provided within the BDM transmission processing logic illustrated in FIG. 4A.

The BDM transmission processing logic 420 employs a novel transport mechanism aimed at providing an efficient technique for transmitting data messages over the radio resource between the central terminal and the subscriber terminal, and more details of the BDM transmission processing logic 420 will be described later with reference to FIG. 4B. However, prior to discussing FIG. 4B, a general discussion of the transport mechanism used in BDM will first be provided.

Figure 6:
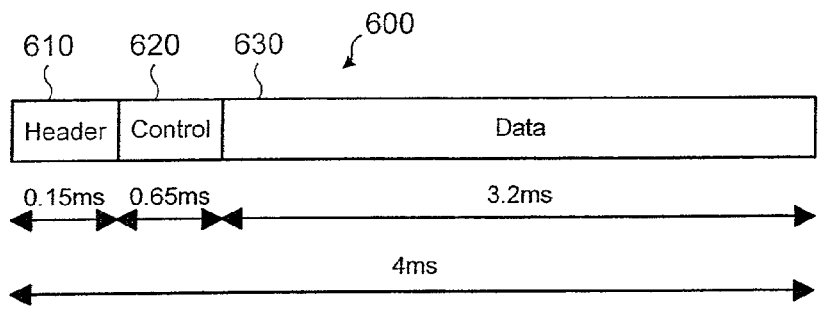
FIG. 6 is a diagram schematically illustrating the format of a frame used in accordance with preferred embodiments of the present invention to transmit data in a block data mode.

In accordance with the BDM approach, individual data messages received by the BDM transmission processing logic 420 are segmented into a number of data blocks, with a frame generator then being used to generate a number of frames to represent each data block. FIG. 6 provides a schematic illustration of the format of each frame produced by the frame generator. Each frame comprises a header portion, which in preferred embodiments is actually subdivided into a header 610 and a control portion 620. The frame 600 also includes a data portion 630 which follows the header and control portions 610, 620. Although the duration of each frame can preferably be varied with chip rate from 2 ms at 5.12 Mchips/s to 10 ms at 1.024 Mchips/s, for any particular implementation the frame duration will typically be fixed, and in preferred embodiments the frame duration is 4 ms.

In preferred embodiments, the header 610 and control portion 620 of each frame are transmitted in a fixed format chosen to facilitate reception of those portions by each subscriber terminal that is arranged to communicate with the central terminal. More particularly, in preferred embodiments, both the header and control portions are modulated using QPSK, have a symbol duration which is fixed at 128 chips per symbol, and have no channel coding applied. The relatively low symbol rate of 128 chips per symbol enables the accurate reception of the header and control portion without the need for any channel coding. The ability to do without any channel coding avoids the need for corresponding FEC decoding circuitry to be provided within the receiver to decode the header and control portions.

The header 610 comprises three QPSK symbols and carries a fixed sequence which is used by the receiver as a training sequence to determine the phase of the carrier. Details of the fixed sequence are as follows:

Symbol 0=guard, downlink I=1, Q=1, uplink no signal

Symbol 1=downlink and uplink I=1, Q=1

Symbol 2=downlink and uplink I=1, Q=0.

The control portion 620 of the header portion is arranged to include a number of control fields for providing information about the corresponding data portion 630, and can also be used to broadcast certain information to the subscriber terminals, given that each subscriber terminal can receive the control portion 620 of any frame, even if the corresponding data portion 630 is not destined for that subscriber terminal. In preferred embodiments, the control portion contains 13 QPSK symbols, i.e. 26 bits of information, and in preferred embodiments those 26 bits are used as illustrated in the table 1 below:

TABLE 1

| Field | # bits | Coding |
|---|---|---|
| Protocol Extension | 1 | 0 |
| ST ID | 8 | 0–255 |
| CTS | 8 | 0–255 |
| PCCS | 4 | xx00 = No change in power |
| | | xx01 = +1dB |
| | | xx10 = −1dB |
| | | 00xx = No change in code phase |
| | | 01xx = +1/32 chip |
| | | 10xx = −1/32 chip |
| Modulation, chips per symbol | 3 | 000 = No data (quiet) |
| | | 001 = 16 chips, QPSK |
| | | 010 = 16 chips, QAM16 |
| | | 011 = 16 chips, QAM64 |
| | | 100 = 16 chips, QPSK low power |
| | | 101 = 32 chips, QPSK |
| | | 110 = 64 chips, QPSK |
| | | 111 = Continuation |
| Channel coding | 2 | 00 = No coding |
| | | 01 = Rate ½ convolutional |
| | | 10 = Rate ¾ convolutional |
| | | 11 = Alternative code |
| Total | 26 | |

The protocol extension bit will preferably be set to zero for preferred embodiments but provides the opportunity to provide some extension of the protocol in due course. The ST identifier field comprises 8 bits, and is used to identify the subscriber terminal to which the corresponding data portion is destined. Typically, the data portion will be destined for a particular subscriber terminal, but it is also possible that ST identifiers can be used to identify a group of subscriber terminals, thus enabling the data portion to be transmitted to that group of subscriber terminals within a single frame. For uplink communications from a subscriber terminal to the central terminal, it is possible that this field may be used to indicate a central terminal identifier, if the subscriber terminal is able to communicate with more than one central terminal.

The Clear To Send (CTS) field is another 8 bit field used to identify a subscriber terminal that is being granted access to transmit a frame of data to the central terminal. The transmission logic provided within a subscriber terminal is basically the same as that provided within the central terminal and illustrated in FIG. 4A, with the exception that the transmission circuitry in the subscriber terminal will not include the resource allocation logic 480, since the allocation of communication channels for both downlink and uplink communications remains under the control of the central terminal. Hence, in preferred embodiments, an active pool of uplink communication channels may be provided for use by the subscriber terminals for sending data blocks to the central terminals. However, to avoid contentious accesses between the various subscriber terminals, when a subscriber terminal has data to transmit, it is preferably arranged to issue a Request To Send (RTS) signal to the central terminal over an orthogonal channel of the radio resource, in preferred embodiments this orthogonal channel being separate to the communication channels used for BDM transmission.

When the central terminal receives an RTS signal from a subscriber terminal, it will allocate a particular uplink communication channel for use by the subscriber terminal to send a frame of data, and will indicate the communication channel to the subscriber terminal by including in the control portion 620 of the corresponding downlink communication channel a CTS signal, the CTS signal identifying the subscriber terminal. Hence the CTS field will typically have a similar format to the STID field, but whereas the STID field identifies the subscriber terminal to which the data portion is destined, the CTS field identifies the subscriber terminal that has been allocated the corresponding uplink communication channel for the transmission of a frame of data.

Having regard to an uplink frame of data, it will be clear that the CTS field has no direct applicability to uplink frames of data. Nevertheless, it is possible that this field can be used to include uplink specific protocol information, for example an indication of the number of blocks/frames that the subscriber terminal still has to send.

As an alternative to the use of the RTS/CTS protocol, it will be appreciated that a random access pool of available uplink communication channels could be provided, with the central terminal periodically transmitting a message identifying the channels available in the pool. Each ST can then request access to a particular uplink communication channel from the pool by seeking acquisition of that channel. The central terminal would then arbitrate between contentious accesses.

Although in Table 1 above the STID and CTS fields are shown as separate, it is possible to implement them via one 16-bit field, which then gives more flexibility as to how many bits are used for the STID and how many bits are used for the CTS signal.

The PCCS field is a 4 bit field populated in both downlink and uplink frames of data, to specify incremental adjustments in both power and code phase to be implemented by the recipient device's transmitter. Illustrations of the level of incremental adjustment are illustrated in Table 1. However, it will be appreciated by those skilled in the art that coarser or finer incremental adjustments may be specified if desired. Hence, this field enables the device transmitting a frame of data to provide feedback to the device at the other end of the wireless link about changes that the recipient device should make to power and code phase prior to transmitting another signal to the transmitting device.

The modulation and chips per symbol field, along with the channel coding field, are preferably used for both downlink and uplink frames of data, and define the variable format used for the corresponding data portion 630. Hence, as can be seen from the table, three parameters are preferably used in preferred embodiments to define the variable format, namely the channel coding used (in preferred embodiments Forward Error Correction (FEC) convolutional encoding is used, although the value "11" can be used to specify some predefined alternative coding), the modulation used, for example QPSK high power, QPSK low power, QAM16 or QAM64, and the symbol rate.

With reference to the modulation and chips per symbol field, it can be seen that this employs three bits to specify both the modulation and the symbol rate. If the three bits are all zeros, this indicates that there is no data in the following data portion, and accordingly the receiver need not attempt to decode the data portion 630. If all three bits are one, this indicates that a block is spanning several frames, this being referred to as a "continuation".

Generally, data formats that enable higher bit rates to be achieved are less tolerant of noise. Hence, if there is a good quality communication link with a subscriber terminal, it should be possible to use a more efficient format for the data portion than may be possible if the communication link were of poorer quality. This is illustrated schematically with reference to FIG. 8 for an idealised case, where the quality of the link is inversely proportional to the distance of the subscriber terminal from the central terminal. Hence, those subscriber terminals within range 700 of the central terminal may choose a data format that uses QAM64 modulation, this enabling up to 192 bytes to be included within a single frame. However, between range 700 and 710, the quality of the communication link is not good enough to support QAM64 modulation, and accordingly instead a data format may be chosen which employs QAM16 modulation, allowing up to 128 bytes to be included in a single frame. If we then move further away from the central terminal, the quality of the link has deteriorated to such an extent that neither QAM64 or QAM16 modulation can reliably be used. Instead, subscriber terminals within the range 720 but outside of the range 710 will instead use a QPSK high power mode, which enables up to 64 bytes to be included within a single frame.

Figure 8:
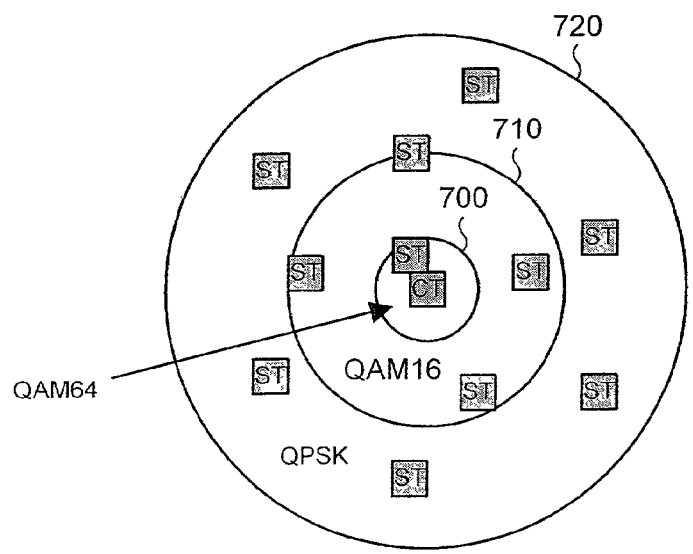
FIG. 8 is a diagram illustrating how the choice of modulation type for the data portion of a frame may be selected in embodiments of the present invention.
Figure 8:
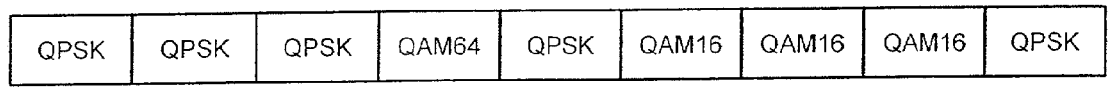

As illustrated in FIG. 8, the modulation applied to frames transmitted on a single communication channel may be varied dynamically dependent on a number of criteria, in preferred embodiments the modulation being changeable every 4 ms.

In preferred embodiments, the predetermined criteria which affects the selection of the variable format by the frame generator comprises an indication of the signal-to-noise ratio (SNR) of signals received by the recipient from the transmitter. Further predetermined criteria which may be used are an indication of the bit error rate and/or signal strength of signals received by the recipient.

Hence, in preferred embodiments, the signal-to-noise ratio will determine which data formats may be used for the data portion of the corresponding frame. Thus, with reference to FIG. 9, if the measured signal-to-noise ratio (relative to QPSK modulation with rate ½ convolutional encoding) is very good, the frame generator may be able to choose between QAM64 and QPSK low power, whilst if the measured signal-to-noise ratio is very poor, the frame generator will have no choice but to use QPSK high power modulation. However, assuming that the measured SNR indicates that there is some choice as to the modulation to be chosen, then a further criteria which is taken into account is the number of bytes that need to be sent, i.e. the number of bytes within the data message.

In preferred embodiments it is desirable to minimise the number of blocks required to send the data message. Hence, if one of the available data formats (having regard to SNR) enables the data message to be transmitted in less blocks than any other available data format, then preferably that data format will be chosen for the one or more data frames in that data block. For example, if the data message is 100 bytes in length, this can incorporated within one data block if QAM16 modulation is used, but two data blocks if QPSK high power modulation is used.

If there are two or more available data formats which will require the same number of blocks to send the data message, then the one which minimises transmission power will be chosen. For example, if the SNR is good, and the data message is 60 bytes in length, QPSK low power will preferably be chosen rather than QAM64.

Figure 7:
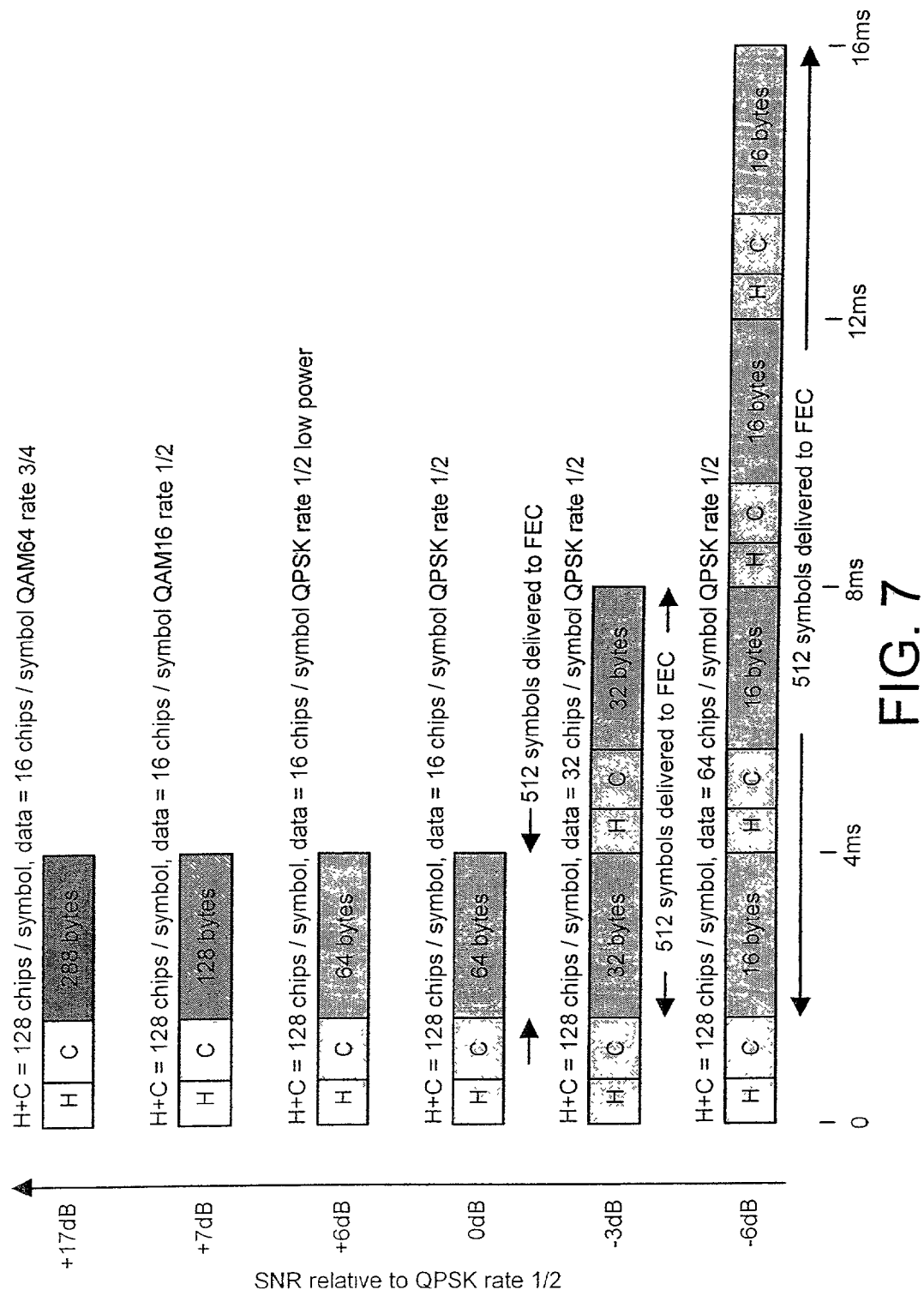
FIG. 7 is a diagram schematically illustrating different formats that may be used for the data portion of a frame in preferred embodiments of the present invention.

In preferred embodiments, the size of a data block is fixed at 512 symbols, which allows 64 bytes of data to be included in the data block for QPSK modulation and rate ½ convolutional encoding. FIG. 7 illustrates some of the data formats identified earlier with reference to FIG. 9, and illustrates how the format of the data portions of frames within a single block may be varied dependent on the measured SNR (where measured SNR is assumed relative to QPSK modulation with rate ½ convolutional encoding transmitted at the normal power level). Hence, as can be seen from FIG. 7, if the SNR is good, for example +17 dB, then the data portion can employ QAM64 modulation, with a symbol rate of 16 chips per symbol and rate ¾ convolutional encoding. This enables 288 bytes to be sent in a single block, and a single frame is required for the block. If the SNR reduces somewhat, for example to around +7 dB, then the variable format for the data portion is altered to use QAM16 modulation, with a symbol rate of 16 chips per symbol and rate ½ convolutional encoding. This enables 128 bytes to be sent in a single block, and again only a single frame is required to send the block.

If the SNR reduces a little further, for example to around+6 dB, then the variable format for the data portion is altered to use QPSK low power modulation, with a symbol rate of 16 chips per symbol and rate ½ convolutional encoding. This enables 64 bytes to be sent in a single block, and again only a single frame is required to send the block.

As the SNR approaches OdB, then the variable format is again changed, such that QPSK modulation and a symbol rate of 16 chips per symbol is used (again with rate ½ convolutional encoding). This enables 64 bytes to be sent in a single block, with again a single frame being required to send the block. As the SNR deteriorates further, the variable format for the data portion is again changed, but from this point on the modulation stays the same, and instead the symbol rate is changed. In particular, at about −3 dB, the symbol rate is decreased to 32 chips per symbol, this being achieved in the CDMA system by increasing the spreading gain. By taking this approach, it is now only possible to send 32 bytes in a single frame, and accordingly two frames are required to deliver the 512 symbol block. As the SNR deteriorates even further, then the symbol rate is again decreased to 64 chips per symbol, which now means that four frames need to be sent to deliver a 512 symbol block.

Table 2 below illustrates in more detail the preferred data formats identified earlier in FIG. 9:

TABLE 2

| SNR (rel) | Chips / symbol | Modulation | Code rate | Bytes / Frame | Block duration | Bytes / Block |
|---|---|---|---|---|---|---|
| 21.5 dB | 16 | QAM64 | Uncoded | 384 | 4 ms | 384 |
| 16.6 dB | 16 | QAM64 | ¾ conv. | 288 | 4 ms | 288 |
| 15.3 dB | 16 | QAM16 | Uncoded | 256 | 4 ms | 256 |
| 10.3 dB | 16 | QAM16 | ¾ conv. | 192 | 4 ms | 192 |
| 7.2 dB | 16 | QAM16 | ½ conv. | 128 | 4 ms | 128 |
| 6.0 dB | 16 | QPSK low power | ½ conv. | 64 | 4 ms | 64 |
| 3.1 dB | 16 | QPSK | ¾ conv. | 96 | 4 ms | 96 |
| 0 dB | 16 | QPSK | ½ conv. | 64 | 4 ms | 64 |
| −3 dB | 32 | QPSK | ½ conv. | 32 | 8 ms | 64 |
| −6 dB | 64 | QPSK | ½ conv. | 16 | 16 ms | 64 |

It will be appreciated that the combinations of modulation and symbol rate set out in Table 2 are not the only options available, and instead any other suitable combinations may be chosen. However, these particular combinations form a continuum which spans a wide operating range of different quality wireless links.

Having described the transport mechanism used by the BDM transmission processing logic 420, the structure of the BDM transmission processing logic 420 will now be discussed in more detail with reference to FIG. 4B.

The BDM transmission processing logic 420 basically comprises an input buffer RAM 405 for storing the data messages to be transmitted, and a frame generator 465. With reference to FIG. 4B, the data routed from the switching element 400 to the BDM transmission processing logic 420 is first received by an input buffer RAM 405, where it is buffered prior to being passed on to the block convolutional encoder and interleaver 415. Control software 445 is provided for determining the settings of all of the fields in the header 610 and control portion 620 of each frame to be generated, which in preferred embodiments has access to a table in storage 455 similar in content to Table 1 discussed earlier, and in particular identifying the setting of the various bits within the control portion 620 dependent on the information to be conveyed by the various fields in the control portion. To enable the control software 445 to determine the appropriate modulation, symbol rate and channel coding, the control software 445 will also have access to appropriate predetermined criteria, such as the SNR, bit error rate, and/or signal strength of signals previously received by the destination subscriber terminal. These predetermined criteria can also be stored within the storage 455.

Figure 9:
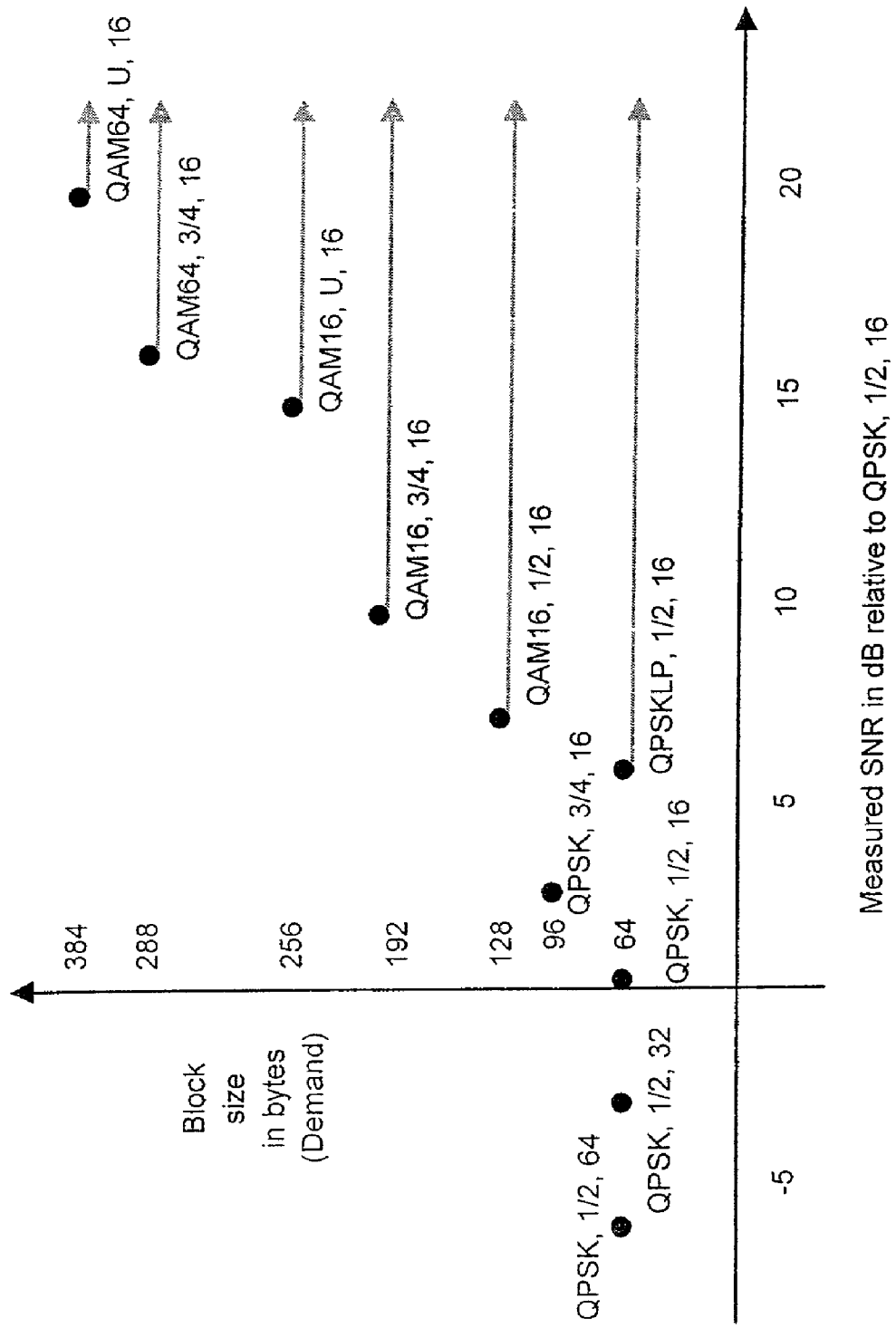
FIG. 9 is a chart illustrating how certain predetermined criteria are influential in the choice of modulation for the data portion of the frame in accordance with preferred embodiments of the present invention.

Referring back to the previous description of FIG. 9, it will recalled that another consideration when choosing the format for the data portion is the amount of data within the data message. As mentioned previously, it is generally desirable to minimise the number of blocks required to send the data message (i.e. maximise throughput). Accordingly, the data messages will be stored in the input buffer RAM 405 and then segmented by the control software 445 into one or more data blocks having regard to the formats that may be used for the block given the SNR measurements, etc. For example, having regard to the earlier described FIG. 9, if the SNR is very good, and the data message contains no more than 64 bytes of data, then the control software 445 will preferably choose QPSK low power mode, rather than QAM64, because QPSK low power mode will generate less noise. However, by contrast, if in the same scenario the data message is greater than 64 bytes, but less than 192 bytes, the control software 445 will choose to send a single QAM64 block, rather than multiple QPSK low power mode blocks, since generally there is a desire to increase the throughput of data, i.e. to reduce the number of blocks required to send the data messages.

In order that the block convolutional encoder and interleaver 415 knows the number of bits to place in each frame, it is arranged to receive the modulation, symbol rate and channel code information from the control software 445 for a particular data block. It then retrieves the corresponding data block from the input buffer RAM 405, and performs convolutional encoding and interleaving of the data to generate the one or more frames required to transmit the data block.

The BDM header formatter 435 is arranged to receive from the control software 445 data for all of the fields of the header and control portions of each data frame, and to then construct the header and control portions based on that information. For each frame, the data portion generated by the block convolutional encoder and interleaver 415, and the header and control portions generated by the BDM header formatter 435, are passed to a symbol mapper 425. The symbol mapper is arranged to receive from the control software 445 details of the modulation chosen for the frame, and to apply that modulation to the various portions of the frame. As mentioned earlier, for the header and control portions, QPSK modulation is always used, whereas for the data portion, the modulation may vary dynamically. Once the modulation has been applied by the symbol mapper 425, the frame of data is output to the CDMA spreader, where CDMA spreading is applied in order to associate that frame with the chosen communication channel over which that frame is to be transmitted. The control software 445 identifies the communication channel to be used for the frame of data.

Figure 5:
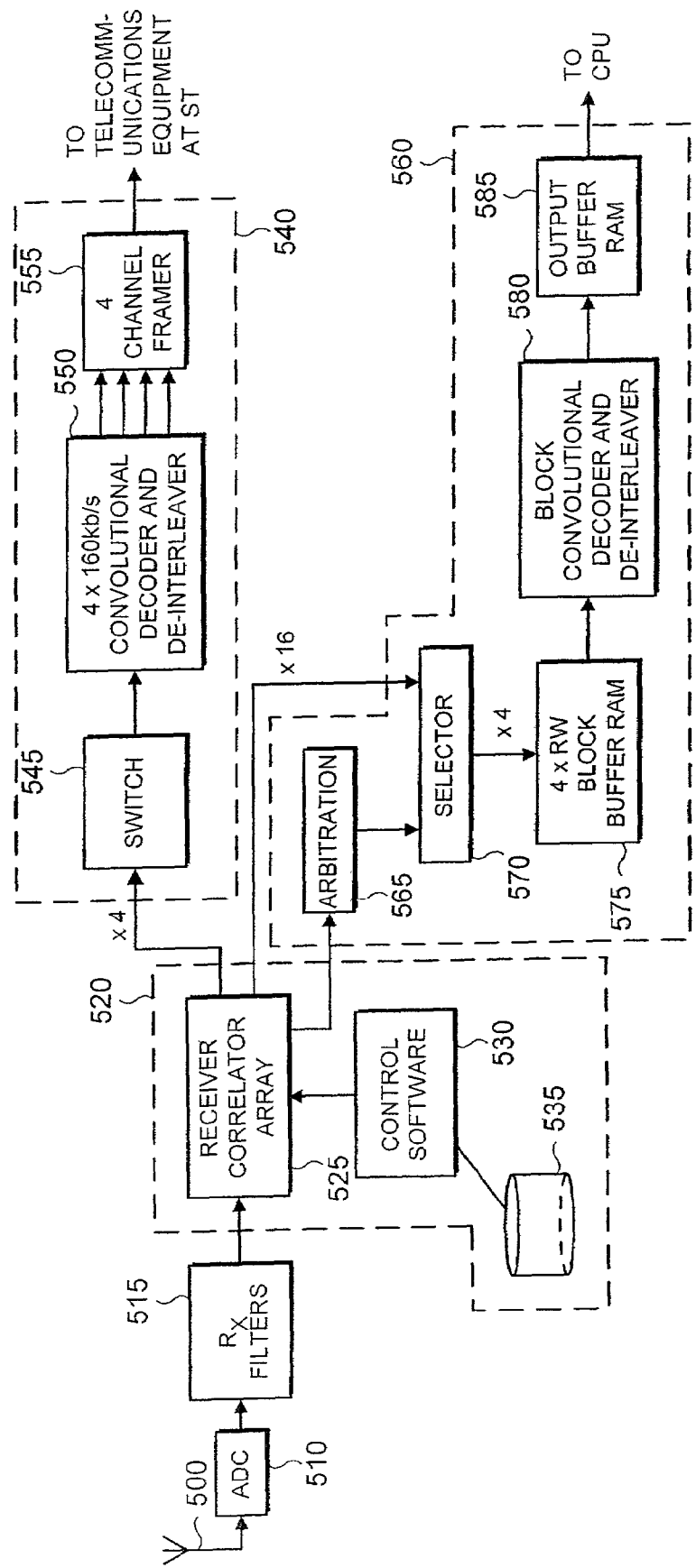
FIG. 5 is a block diagram illustrating the elements provided within the receiver of a subscriber terminal in accordance with preferred embodiments of the present invention to enable data transmitted by either of the two transport mechanism to be received and appropriately decoded.

Having described the transmission circuitry within the central terminal in accordance with preferred embodiments, the reception circuitry employed within a subscriber terminal in accordance with preferred embodiments of the present invention will now be described with reference to FIG. 5. The signal transmitted by the central terminal is received by the subscriber terminal at receiver 500, and passed through analogue-to-digital converters (ADCs) 510 and receive filters 515. The received signal is then passed to channel switching logic 520 which basically consists of a receiver correlator array 525, along with associated control software 530.

The receiver correlator array preferably includes a separate correlator for each possible communication channel, and accordingly, assuming 16 RW orthogonal channels are provided for a radio resource consisting of a particular frequency channel, then the receiver correlator array 525 will consist of 16 correlators C0 to C15. The control software 530 will receive information from the central terminal over a control channel identifying which communication channels have been allocated to the voice transmission processing logic 410 in the transmitter and which communication channels have been allocated to the BDM transmission processing logic 420. Based on this information, the control software 530 can identify to each correlator whether it should be looking for BDM data frames or data issued by the voice transmission processing logic. For example, if communication channel 3 has been allocated by the resource allocation logic 480 to BDM transmission processing logic 420, then a corresponding correlator C3 can be set by the control software 530 so that it is seeking to identify a BDM data frame.

In preferred embodiments, rather than having a hard wired relationship between communication channels and particular correlators, any correlator can be assigned to any communication channel, and accordingly the control software 530 will also provide a signal to each correlator identifying the RW orthogonal channel that the correlator should be looking for. Further, in preferred embodiments, the control software 530 will be informed over the control channel by the central terminal (preferably control software 445) of the STID associated with a corresponding communication channel allocated to the BDM transmission processing logic 420, and accordingly this STID information is also provided to the appropriate correlators.

Any information received by the control software 530 over the control channel can be stored in storage 535 for reference by the control software when setting parameters for individual correlators in the array 525.

In preferred embodiments, as mentioned earlier, in the absence of transmission activity by the voice transmission processing logic 410, all 16 orthogonal channels can be allocated to the BDM transmission processing logic 420, and accordingly the receiver correlator array 525 may receive up to 16 BDM frames at any one time. Since the header and control portions of these frames are uncoded, the contents of the header and control portions of each frame can be determined by the corresponding correlators and disseminated to the appropriate elements within the subscriber terminal. In particular, the modulation, symbol rate and channel coding information can be provided to the BDM reception processing logic 560 for use in decoding incoming BDM frames. Further, the PCCS field data can be provided to the appropriate software function within the subscriber terminal's transmitter used to manage uplink power control and code phase. Similarly, the CTS field can be routed onto the software function within the subscriber terminal's transmitter responsible for generating the RTS signal to which the CTS signal has been sent in response. Finally, the STID field is used by the relevant correlator within the receiver correlator array 515 to compare with the STID provided by the control software 530 to determine if there is a match. If there is a match, the receiver correlator array 525 will issue a hit signal to the arbitration logic 565.

Whilst all of the communication channels are by default allocated to the BDM transmission processing logic 420, up to four of the communication channels may be allocated to the voice transmission processing logic 410 as and when required to handle voice calls. Accordingly, 4 of the 16 correlators within the correlator array 525 can be arranged to receive data transmitted by the voice transmission processing logic 410, and to output the received signals to the voice reception processing logic 540.

The voice reception processing logic 540 includes a switch 545, which is used to turn the circuitry off when none of the communication channels are being used by the voice transmission processing logic. In preferred embodiments, the control software 530 controls the switch 545. This avoids any unnecessary processing of BDM data frames within the voice reception processing logic 540. However, assuming signals from the voice transmission processing logic 410 are received within the receiver correlator array 525, the switch 545 is switched on, such that up to four communication channels worth of data can be provided to the convolutional decoder and deinterleaver circuitry 550. This convolutional decoder and deinterleaver 550 can decoder and deinterleave up to four 160 Kb/s communication channels with the four resultant data streams then being passed to a four channel framer 555. As will be appreciated by those skilled in the art, the channel framer performs frame alignment, and identifies the end point for each channel of data, i.e. the item of telecommunications equipment to which the corresponding data is destined.

Looking now at the BDM reception processing logic 560, the signals received on up to all 16 of the communication channels are output from the receiver correlator array 525 to a selector 570. The selector 570 is controlled by the arbitration logic 565 dependent on the hit signals received from the receiver correlator array 525. In accordance with preferred embodiments, up to four frames of data may be simultaneously sent to the same subscriber terminal, and accordingly in the absence of degradation of the signal due to interference, etc., the arbitration logic 565 should only receive between 0 and 4 hit signals at any one time. However, it is possible that due to interference, etc., the arbitration logic 565 may receive more than four hit signals, and will accordingly have to perform some arbitration to determine which four communication channels should be selected by the selector 570 for processing within the BDM reception processing logic 560.

In preferred embodiments, the decision as to which communication channel(s) to drop if more than four hit signals are received is typically an arbitrary decision, for example using a round-robin technique. However, if in the previous frame a continuation frame was received on a particular communication channel, then in preferred embodiments that communication channel will not be dropped, as clearly a hit signal would be expected on that communication channel.

Accordingly, the selector 570 will receive between 0 and 4 select signals from the arbitration logic 565, and will accordingly select the corresponding communication channels for passing through to the block buffer RAM 575. The block buffer RAM 575 is able to store data frames for up to four orthogonal channels. The received data frames are then passed through a block convolutional decoder and de-interleaver 580 one frame at a time. As mentioned earlier, the block convolutional decoder and de-interleaver 580 will have access to the modulation, symbol rate and channel coding information extracted from the corresponding control portion of each data frame by the receiver correlator array 525, and accordingly can apply appropriate techniques to determine the data in the data portion. The resultant data is then output to an output buffer RAM 585, from where it is output to an appropriate item of equipment connected to the ST, for example a central processing unit (CPU) of a personal computer.

From the above description of a preferred embodiment of the present invention, it can be seen that the provision of two different transport mechanisms, along with appropriate structures to enable selection between the transport mechanisms based on predetermined criteria, and the allocation of appropriate communication channel resource to each transport mechanism, provides a very flexible transmission mechanism for improving the efficiency of transfer of data of different types within a telecommunication system.

In preferred embodiments, the first transmission mechanism is preferably used for continuous data streams such as voice data. Accordingly, this first transport mechanism is optimised for low rate, low delay connection based services, and preferably supports rates of 10 Kb/s (control only), 20 Kb/s, 40 Kb/s, 80 Kb/s and 160 Kb/s. The second transport mechanism is a new transport mechanism aimed at increasing efficiency of transfer of bursty data. In preferred embodiments it is optimised for high data rates and enables on-the-fly header decoding and spreader/modulation control. Having particular regard to the block data mode of preferred embodiments, it can be seen that this mode supports dynamic modulation to optimise system throughput, facilitates variable rate channel coding, and allows quiet blocks with no data transmission to be sent in order to reduce interference.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A telecommunications system for connecting to a network and for routing data messages between the network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the telecommunications system comprising:

a transmitter within the central terminal for sending a data message destined for a particular subscriber terminal over at least one of the communication channels as a number of data blocks; and a frame generator within the central terminal for generating a number of frames to represent each data block, each frame having a header portion and a data portion, the header portion being arranged to be transmitted in a fixed format chosen to facilitate reception of the header portion by each subscriber terminal and being arranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined;

wherein the predetermined criteria comprises an indication of the signal-to-noise ratio (SNR) of signals received by the destination subscriber terminal from the central terminal, and if there are a plurality of formats selectable as the variable format given the indicated signal-to-noise ratio and the amount of data to be sent in the data block, then the frame generator is arranged to select from those plurality of formats the format requiring lowest transmission power.

2. A telecommunications system as claimed in claim 1, wherein the variable format is defined by a number of parameters, a first parameter being a channel coding to be applied to the data in the corresponding data portion.

3. A telecommunications system as claimed in claim 2, wherein a second parameter is a modulation type to be applied to the data in the corresponding data portion.

4. A telecommunications system as claimed in claim 3, wherein a third parameter is a symbol rate for the data in the corresponding data portion.

5. A telecommunications system as claimed in claim 2, wherein the parameters defining the variable format used for the data portion are identified in one or more control fields of the corresponding header portion.

6. A telecommunications system as claimed in claim 1, wherein the fixed format used for the header portion employs a relatively low symbol rate.

7. A telecommunications system as claimed in claim 1, wherein the fixed format used for the header portion employs no channel coding.

8. A telecommunications system for connecting to a network and for routing data messages between the network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the telecommunications system comprising:

a transmitter within the central terminal for sending a data message destined for a particular subscriber terminal over at least one of the communication channels as a number of data blocks; and a frame generator within the central terminal for generating a number of frames to represent each data block, each frame having a header portion and a data portion, the header portion being arranged to be transmitted in a fixed format chosen to facilitate reception of the header portion by each subscriber terminal and being arranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined, wherein each subscriber terminal comprises a first number of channel monitors to enable each of the communication channels to be monitored, whereby each subscriber terminal can read the header portion of each frame irrespective of which communication channel that frame is transmitted on.

9. A telecommunications system as claimed in claim 8, wherein the predetermined criteria comprises an indication of the signal-to-noise ratio (SNR) of signals received by the destination subscriber terminal from the central terminal.

10. A telecommunications system as claimed in claim 9, wherein if there are a plurality of formats selectable as the variable format given the indicated signal-to-noise ratio and the amount of data to be sent in the data block, then the frame generator is arranged to select from those plurality of formats the format requiring lowest transmission power.

11. A telecommunications system as claimed in claim 8, wherein comprises a second number of processors for processing data portions destined for that subscriber terminal based on information about the variable format identified in the control fields of the corresponding header portion, and the channel monitors being arranged to identify to the processors those frames containing data portions destined for that subscriber terminal.

12. A telecommunications system as claimed in claim 11, wherein the second number of processors is less than the first number of channel monitors, whereby at any point in time the header portions of the frames on each of the communication channels can be read, but only the second number of data portions can be processed by a particular subscriber terminal.

13. A telecommunications system for connecting to a network and for routing data messages between the network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the telecommunications system comprising:

a transmitter within the central terminal for sending a data message destined for a particular subscriber terminal over at least one of the communication channels as a number of data blocks; and a frame generator within the central terminal for generating a number of frames to represent each data block, each frame having a header portion and a data portion, the header portion being arranged to be transmitted in a fixed format chosen to facilitate reception of the header portion by each subscriber terminal and being arranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined, wherein the frame generator is also provided in at least one of the subscriber terminals to enable frames to be generated for data blocks to be transmitted from the subscriber terminal to the central terminal, the subscriber terminal being arranged to issue to the central terminal over the transmission medium a request signal when it has data to send to the central terminal, the central terminal being responsive to the request signal to grant access to the subscriber terminal on a communication channel selected by the central terminal.

14. A telecommunications system as claimed in claim 13, wherein the central terminal is arranged to grant access by including in a control field of a frame issued by the central terminal on the selected communication channel a grant signal identifying the subscriber terminal.

15. A telecommunications system as claimed in claim 14, wherein the grant signal grants the subscriber terminal access to the selected communication channel to send one frame, the subscriber terminal being arranged to continue asserting the request signal until a grant signal has been received for the final frame that the subscriber terminal has to send.

16. A telecommunications system as claimed in claim 1, wherein the header portion includes a power control field for identifying a power control signal to be used by the recipient of the frame to control the power of signals subsequently issued by that recipient.

17. A telecommunications system as claimed in claim 1, wherein the header portion includes a code synchronisation control field for identifying a code synchronisation signal to be used by the recipient of the frame to control to code synchronisation of signals subsequently issued by that recipient.

18. A telecommunications system as claimed in claim 1, wherein the header portion includes a field containing a predetermined training sequence used by the recipient of the frame to determine the phase of a carrier signal.

19. A telecommunications system as claimed in claim 1, wherein the transmission medium is a radio resource facilitating wireless communications between the central terminal and the subscriber terminals.

20. A telecommunications system as claimed in claim 1, wherein the communication channels are orthogonal channels defined using CDMA.

21. A method of operating a telecommunications system to route data messages between a network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the method comprising the steps of:
transmitting the data message destined for a particular subscriber terminal from the central terminal over at least one of the communication channels as a number of data blocks; and
generating a number of frames to represent each data block to be transmitted, each frame having a header portion and a data portion, the header portion being arranged to be transmitted in a fixed format chosen to facilitate reception of the header portion by each subscriber terminal and being arranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined;

wherein the predetermined criteria comprises an indication of the signal-to-noise ratio (SNR) of signals received by the particular subscriber terminal from the central terminal, and if there are a plurality of formats selectable as the variable format given the indicated signal-to-noise ratio and the amount of data to be sent in the data block, then selecting in the frame generator from those plurality of formats the format requiring lowest transmission power.

22. A frame generator for a telecommunications system for connecting to a network and for routine data messages between the network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, and including a transmitter within the central terminal for sending a data message destined for a particular subscriber terminal over at least one of the communication channels as a number of data blocks, the frame generator comprising: the frame generator comprising resources being arranged to generate a number of frames to represent a data block to be transmitted over the transmission medium, each frame having a header portion and a data portion, the header portion being arranged to be transmitted in a fixed format chosen to facilitate reception of the header portion by each subscriber terminal and being arranged to include a number of control fields the providing information about the data portion, said information comprising at least an indication of the subscriber terminal for which the corresponding data portion of the fame is destined, the data portion being arranged to be transmitted in a variable format selected based on predetermined criteria relevant to the particular subscriber terminal to which the data portion is destined; wherein the predetermined criteria comprises an indication of the signal-to-noise ratio (SNR) of signals received by the destination subscriber terminal from the central terminal, and if there are a plurality of formats selectable as the variable format given the indicated signal-to-noise ratio and the amount of data to be sent in the data block, then the frame generator is arranged to select from those plurality of formats the format requiring lowest transmission power.

23. A method of operating a telecommunications system to route data messages between a network and subscriber terminals of the telecommunications system, the subscriber terminals being connectable to a central terminal of the telecommunications system via a transmission medium, the telecommunications system providing a number of communication channels arranged to utilise the transmission medium for transmission or data between the central terminal and the subscriber terminals, the method comprising the steps of:
transmitting the data message destined for a particular subscriber terminal from the central terminal over at least one of the communication channels as a number of data blocks;
generating a number of frames to represent each data block to be transmitted, each frame having a header portion and a data portion, the header portion being arranged to be transmitted in a fixed format chosen to facilitate reception of the header portion by each subscriber terminal and being arranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined; and monitoring at each subscriber terminal each of the communication channels, whereby each subscriber terminal can read the header portion of each frame irrespective of which communication channel that frame is transmitted on.

24. A method of operating a telecommunications system to route data messages between a network and subscriber terminals of the telecommunications system, the subscriber terminals being connectable to a central terminal of the telecommunications system via a transmission medium, the telecommunications system providing a number of communication channels arranged to utilise the transmission medium for transmission of data between the central terminal and the subscriber terminals, the method comprising the steps of;

transmitting the data message destined for a particular subscriber terminal from the central terminal over at least one of the communication channels as a number of data blocks;

generating a number of frames to represent each data block to be transmitted, each frame having a header portion and a data portion, the header portion being arranged to be transmitted in a fixed format chosen to facilitate reception of the header portion by each subscriber terminal and being ranged to include a number of control fields for providing information about the data portion, said information comprising at least an indication of the subscriber terminal for which the corresponding data portion of the frame is destined, the data portion being arranged to be transmitted in a variable format selected based on predetermined criteria relevant to the particular subscriber terminal to which the data portion is destined; and generating frames in a frame generator in the subscriber terminal for data blocks to be transmitted from the subscriber terminal to the central terminal, issuing from the subscriber terminal to the central terminal over the transmission medium a request signal when the subscriber terminal has data to send to the central terminal, the central terminal being responsive to the request signal to grant access to the subscriber terminal on a communication channel selected by the central terminal.

* * * * *

UNITED STATES PATENT AND TRADEMARK OFFICE
CERTIFICATE OF CORRECTION

PATENT NO.        : 7,177,320 B2                                      Page 1 of 1
APPLICATION NO.   : 09/942790
DATED             : February 13, 2007
INVENTOR(S)       : Martin Lysejko and Jeremy L. Cohen It is certified that error appears in the above-identified patent and that said Letters Patent is
   hereby corrected as shown below:

In claim 1, column 25, line 14, replace the words "the destination" with -- a destination --.

In claim 9, column 26, line 11, replace the word "tenninal" with -- terminal --.

In claim 11, column 26, line 61, after the word "wherein" please insert -- each subscriber terminal --.

In claim 18, column 27, line 31, replace the words "the recipient" with -- each recipient --.

In claim 22, column 28, line 30, replace the words "the providing" with -- for providing --.

In claim 23, column 28, line 52, replace the word "or" with -- of --.

In claim 24, column 30, line 4, replace the word "ranged" with -- arranged --.

Signed and Sealed this

Eighteenth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,177,320 B2  
APPLICATION NO. : 09/942790  
DATED : February 13, 2007  
INVENTOR(S) : Martin Lysejko and Jeremy L. Cohen Page 1 of 1

It is certified that error appears in the above-identified patent and that said Letters Patent is hereby corrected as shown below:

In claim 1, column 25, line 14, replace the words "the destination" with -- a destination --.

In claim 9, column 26, line 11, replace the word "tenninal" with -- terminal --.

In claim 11, column 26, line 19, after the word "wherein" please insert -- each subscriber terminal --.

In claim 18, column 27, line 31, replace the words "the recipient" with -- each recipient --.

In claim 22, column 28, line 30, replace the words "the providing" with -- for providing --.

In claim 23, column 28, line 52, replace the word "or" with -- of --.

In claim 24, column 30, line 4, replace the word "ranged" with -- arranged --.

This certificate supersedes Certificate of Correction issued September 18, 2007.

Signed and Sealed this

Twentieth Day of November, 2007

JON W. DUDAS  
*Director of the United States Patent and Trademark Office*